United States Patent [19]
Shim et al.

[11] 3,781,902
[45] Dec. 25, 1973

[54] RECORDER/PROCESSOR APPARATUS

[75] Inventors: Ivan H. Shim, Fairfield; John J. Stelben, Greenwich, both of Conn.

[73] Assignee: The United States of America as represented by the Administrator of the National Aeronautics and Space Administration, Washington, D.C.

[22] Filed: Sept. 7, 1971

[21] Appl. No.: 177,985

[52] U.S. Cl. ...................... 346/24, 34/162, 95/89 R, 178/6.7 R, 219/216, 219/388, 346/108, 346/138

[51] Int. Cl. ........................................................ G01d

[58] Field of Search .................... 346/108, 138, 134, 346/76 L, 24; 178/6.7 R, 7.4; 34/162; 219/216, 388; 95/89 R, 89 F, 89 G, 14

[56] References Cited

UNITED STATES PATENTS

| | | | |
|---|---|---|---|
| 1,075,614 | 10/1913 | Tschorner | 178/6.7 R |
| 3,084,448 | 4/1963 | Dungler | 34/162 X |
| 3,098,260 | 7/1963 | Richeson | 34/162 X |
| 3,230,858 | 1/1966 | Brown et al. | 95/89 X |
| 3,374,311 | 3/1968 | Hell | 178/6.6 B |
| 3,534,380 | 10/1970 | East et al. | 346/24 X |
| 3,621,201 | 11/1971 | Crane | 219/388 |
| 3,654,624 | 4/1972 | Becker et al. | 346/138 X |

*Primary Examiner*—Joseph W. Hartary
*Attorney*—Myron Cohen et al. and Robert F. Kempf et al.

[57] ABSTRACT

An apparatus for recording a data input on, and thermally processing, a thermally processible storage medium in which a light source, such as a modulated laser beam whose intensity is modulated in response to the incoming data input, such as a video signal, is caused to generate a raster in conformance with incoming timing/control signals so as to expose a latent image of the input information on the storage medium. A rotating drum in conjunction with an incrementally driven lens carriage associated with the laser optical system provides the raster generation. The drum is automatically loaded with the storage medium from a supply means and automatically unloaded to a thermal processor upon completion of recording. The latent image is processed by the controlled application of heat so as to produce an actual displayable image corresponding to the data input at the output of the apparatus.

25 Claims, 11 Drawing Figures

PATENTED DEC 25 1973 3,781,902

SHEET 3 OF 7

RECORDER/PROCESSOR APPARATUS

BACKGROUND OF THE INVENTION

1. Field of the Invention

The present invention relates to systems for recording the latent image and for processing this image to produce an actual displayable image at the output of the system.

2. Description of the Prior Art

Prior art recording systems, particularly those utilizing a laser beam for recording of information, in which a latent image is recorded, such as by modulating the intensity of the laser beam in accordance with the input information, are not capable of providing an actual displayable image at the output of the system. These prior art systems are not capable of producing a latent image which must be processed separately in a photo laboratory, thereby introducing a significant delay time between the recording of the latent image and the developing of this image into an actual displayable image. This problem is prevelant in all such laser recording systems utilizing silver halide film or paper or some other wet processible storage medium. It is equally true for any type of light source in which such wet processible storage medium is utilized, such as a glow tube modulator.

With the advent of a dry processed storage medium, such as 786 dry silver film manufactured by Minnesota Mining and Manufacturing Company or 774 dry silver paper manufactured by Minnesota Mining and Manufacturing Company, some of the problems associated with the use of a wet processible storage medium have been eliminated. This dry storage medium is a rapid accessed material which lends itself to recording at a rapid exposure rate with relatively high resolution scanning rasters. There are several problems, however, still present in such laser recording systems and, to date, no satisfactory recording systems capable of recording a latent image from which an essentially real time actual displayable image is produced at the output of the system are available.

In addition, prior art raster scan recording systems utilize a continuous line advance to generate the raster scan which introduces significant problems in the laser recorder when the recorder is interfaced with a data input source which does not provide a continuous stream of data but rather incrementally provides such data in interupted fashion, such as a computer output. In addition, in processors utilized for such a dry processible storage medium which is slowly processed by the controlled application of heat, the storage medium is placed on a platen. This may result in uneven processing and emulsion peel off, the uneven processing being due to a lack of uniform contact over the entire platen surface. Accordingly, there are presently no available recorder/processor systems capable of automatically loading an unexposed storage medium, exposing the film for recording a latent image thereon, thereafter automatically unloading the recorded storage medium to a processor therefor, and producing a completely processed actual displayable image at the system output.

These disadvantages of prior art are overcome by the present invention.

SUMMARY OF THE INVENTION

An apparatus for recording a data input on, and thermally processing, a thermally processable storage medium wherein a laser beam whose intensity is modulated in response to an incoming signal, such as a video signal, is preferably utilized to generate a raster in conformance with the incoming timing/control signals so as to expose a latent image on the storage medium corresponding to the signal input. After exposure of the latent image this image is processed by the controlled application of heat to produce an actual displayable image from the latent image at the output of the system. The recorder/processor system utilizes a rotating drum and an incrementally driven lens carriage in association with the laser optic system in order to generate the raster. The drum is automatically loaded with the thermally processible medium, such as a dry process film or paper, from a supply cassette and automatically unloaded to a thermal processor on completion of recording for processing of the latent image into the actual displayable image.

The thermal processor preferably includes a processing chamber, which normally contains air, having a pair of spaced apart heating means, such as heating rods, which heat the air within the chamber to provide thermal conduction in the chamber through the heated air, and a low mass supporting means for supporting the exposed storage medium on one side thereof. The low mass supporting means is substantially uniformly spaced between the heating means pair so as to be subjected to heat from both of the opposite sides thereof. The exposed storage medium is within the processing chamber for a predetermined time interval sufficient to enable the thermal conduction within the chamber to develop the latent image into the actual displayable image. The conveyor means comprises a pair of low mass endless belts, the pair comprising an upper belt and a lower belt, the lower belt being the aforementioned supporting means. The unprocessed or exposed storage medium is conveyed to the thermal processing chamber from the recording drum between the upper and lower belts and is substantially held in place therebetween by the relative tensions of the belts. The conveyor means also includes a means for separating the upper and lower belts prior to the thermal processing of the unprocessed storage medium latent image wherein the unprocessed storage medium is conveyed to the processing chamber solely on the lower belt during the thermal processing of the latent image into the actual displayable image. The low mass material, such as a nylon material manufactured under the name Nomex, does not act as a heat sink during the thermal processing of the latent image. The belts are relatively cool except during the actual thermal processing due to both their low mass and the length of the return paths followed by the belts in the conveyor system. Accordingly, the unprocessed film does not adhere to the cool belts. Furthermore, during the thermal processing of the latent image, due to the thermal conduction within the chamber around the image, the latent image is processed evenly and no emulsion peel-off results as there is no physical contact with the latent image. If desired, a conventional thermal processor utilizing a platen can be utilized in conjunction with the automatic loading and unloading portions of the recorder system to provide an actual displayable image output for the system from the recorded latent image.

DETAILED DESCRIPTION OF THE PREFERRED EMBODIMENTS

General Description

Figure 1:
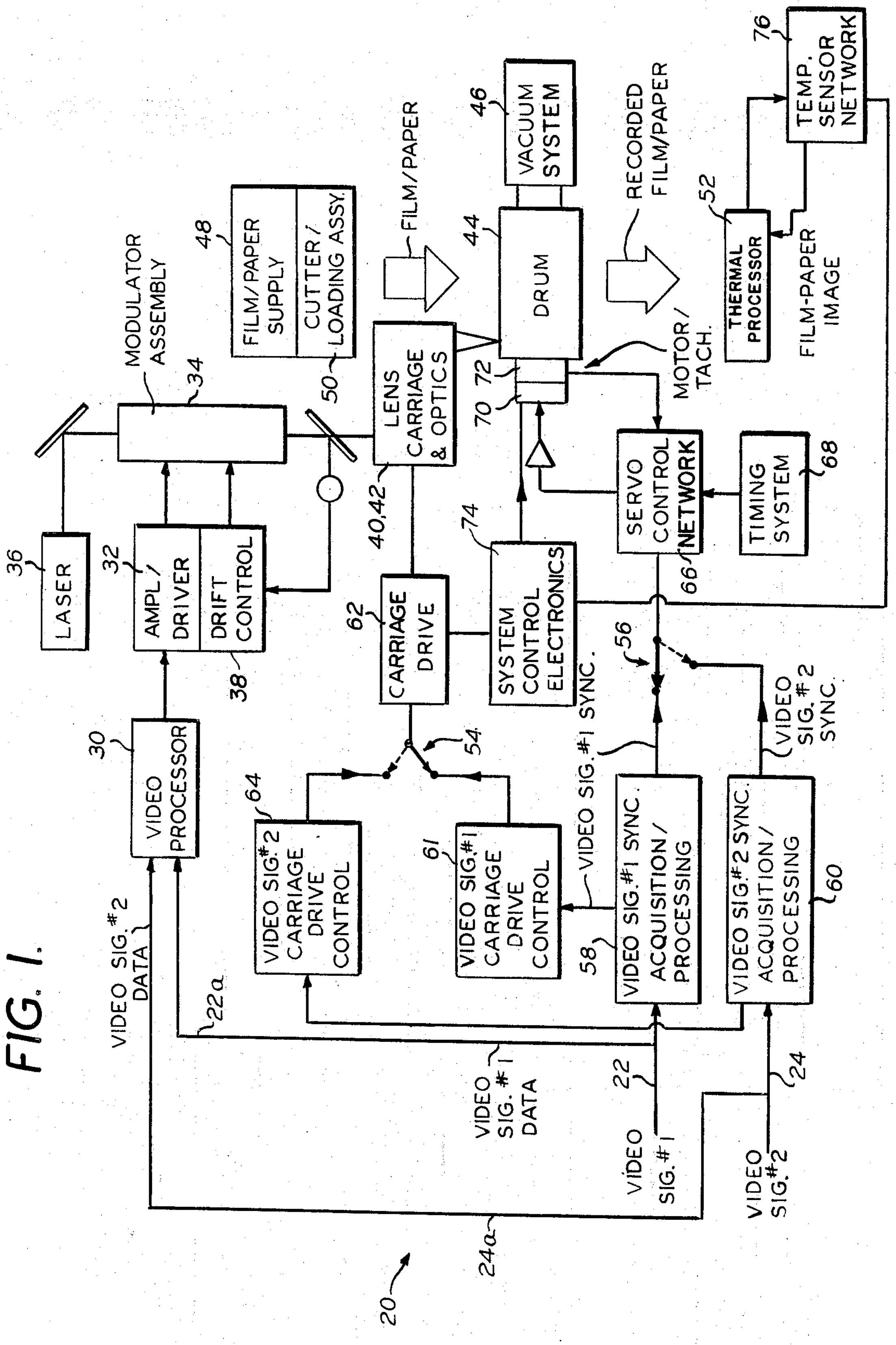
FIG. 1 is a simplified functional block diagram of the preferred embodiment of the recorder/processor system of the present invention.

Referring now to the figures in detail and especially to FIG. 1 thereof, the overall recorder/processor system of the present invention, generally referred to by the reference numeral 20, will initially be described for purposes of clarity and the pertinent specific portions in greater detail thereafter. FIG. 1 is a simplified functional block diagram of the overall recorder/processor system 20. By way of illustration and not limitation, the recorder/processor system 20 of the present invention will be described with reference to the receipt of and selection of one of two incoming video signals, labeled, respectifely, "VIDEO SIG. 1" and "VIDEO SIG. 2", although, as will be obvious to one of skill in the art, the system 20 of the present invention may be utilized solely with one incoming signal or with greater than two incoming signals. Furthermore, these signals need not be video signals as such. The source of the incoming video signals, not shown, may be any conventional source of video signals such as satellites utilized to scan the earth's surface to provide such information as meteorological data therefrom. The incoming video signal labeled "VIDEO SIG. 1" is input to the recorder/processor system 20 via path 22 and the incoming video signal labeled "VIDEO SIG. 2" is input to the recorder/processor system 20 via path 24.

The respective information or data portions of the composite incoming video signals provided via paths 22 and 24, respectively, are fed to the input of a conventional video processor network of the type utilized in conventional facsimile devices for reproducing continuous tone material, such as the type manufactured by Muirhead. The video processor network 30, which is conventional, will not be described in greater detail hereinafter. Suffice it to say that this network 30 provides positive or negative selection, gamma compensation for any non-linear response of the storage medium, and includes an enhancement amplification network to provide for "black or white stretch" for the video signal in order to distort this signal to emphasize either white or black detail, if desired, in order to emphasize the desired detail against a contrasting background. However, if no such "stretch" or enhancement is desired, this portion of the video processor network 30 need not be included.

The output of the video processor network 30 is supplied to an amplifier/driver network 32, which is conventional and will not be described in greater detail hereinafter, which amplifies the signal level of the video signal output of the video processor 30 to a predetermined level. The output of the amplifier/driver network 32 is utilized to drive a conventional electro-optic modulator assembly 34 which is preferably a laser modulator utilizing a conventional laser light source 36, such as an argon laser. The drive signal supplied from the amplifier/driver network 32 is preferably at the signal level necessary to drive the electro-optic laser modulator assembly 34. A conventional drift control network 38 is preferably associated in an electro-optic feedback loop with the output of the modulator assembly 34 in order to compensate for any modulator drift characteristics such as due to ambient temperature variations. If such compensation is not desired, the drift control network 38 may be omitted. As will be described in greater detail hereinafter, the modulator assembly 34 preferably modulates the intensity of the laser beam from laser 36 in response to the incoming video signal, provided via video processor 30 and amplifier/driver 32 to the modulator assembly 34, in order to generate a raster in conformance with incoming timing/control signals.

The intensity modulated laser beam output of modulator assembly 34 is supplied through a laser optical system 40 to a lens carriage 42 having a focusing lens thereon which focuses the intensity modulated laser output to form a recording spot. The recording spot is focused on a recording drum 44, which will be described in greater detail hereinafter, preferably having a thermally processable storage medium held on the outer surface thereof during recording, such as by a conventional vacuum system 46. As will be described in greater detail hereinafter, the focused recording spot is utilized to generate a raster scan line on the storage medium located on the drum 44, the point of focus of the spot being preferably advanced parallel to the drum axis of rotation so as to generate the plurality of scan lines forming the raster scan.

As will also be explained in greater detail hereinafter, the storage medium, which is preferably film or paper, is preferably supplied to the drum 44 automatically from a film/paper supply roll 48 through a cutter/loading assembly 50 which cuts a predetermined quantity of the storage medium from the supply after the storage medium is loaded on to the drum 44. At the completion of recording on the storage medium previously loaded on to drum 44, the thermally processable storage medium, then having a latent image recorded thereon, is unloaded from the drum 44 to a thermal processor 52, which will be described in greater detail hereinafter, where it is processed to produce an actual displayable image from the recorded latent image.

Both the lens carriage 42 and the drum 44 are driven in response to the associated sync signal of the composite video signal input, the desired input being selected by means of conventional switches 54 and 56 for the lens carriage drive and the drum drive, respectively. The composite video signal labeled "VIDEO SIG. 1," supplied via path 22, is fed to a conventional sync acquisition/processing network 58, preferably a conventional sync separator network, which provides the sync signals associated with "VIDEO SIG. 1" as an output thereof. Similarly, the composite video signal "VIDEO SIG. 2," supplied via path 24, is fed to a preferably identical sync acquisition/processor network 60 whose outputs are the sync signals associated with composite "VIDEO SIG. 2." One of the sync signals outputs of sync separator 58 is fed to switch 56, shown in position to receive VIDEO SIG. 1, while the other output is fed to conventional carriage drive control electronics 61 which supplies an advance pulse through switch 54 to the carriage motor drive 62, which will be described in greater detail hereinafter. Similarly, one of the sync outputs of sync separator 60, for VIDEO SIG. 2, is fed to associated carriage drive control electronics 64, which are preferably identical to carriage drive control electronics 61, to supply an advance pulse to the carriage drive 62 through switch 54 in response to the VIDEO SIG. 2 sync signal. As shown in FIG. 1, switch 54 is in position so as to render the carriage drive 62 responsive solely to the VIDEO SIG. 1 sync pulses. The carriage drive 62 is operatively connected to the lens carriage 42 for preferably incrementally advancing the lens carriage line by line in response to receipt of an associated sync pulse. The other VIDEO SIG. sync output of sync separator 58 and of sync separator 60, respectively, as was previously mentioned, are fed to switch selector 56, which is shown in position to select solely the sync signal output associated with VIDEO SIG. 1. The output of switch 56 is connected to a conventional servo control network 66 which regulates the speed of rotation of drum 44 and the phasing of the drum 44 with respect to the incoming sync signals, as will be described in greater detail hereinafter. The drum velocity is determined from the input sync signals, the rate or velocity being dependent on the input scan rate, and the phasing is determined by the position of the sync pulses in time.

A timing system 68 is associated with the servo control network 66 for processing the input sync signals to establish the appropriate drum velocity. The drum 44 is driven by a motor drive 70 which is connected in a servo control loop with the servo control network 66 and timing system 68 via an associated optical tachometer 72. As will be described in greater detail hereinafter, the optical tachometer preferably has two tracks thereon, one of the tracks being a high density track for speed control, the other track being a once per revolution track for phasing control. In order to provide for phasing in the servo control feedback loop, the once per revolution optical tachometer output is compared with the incoming sync pulse in order to determine if there is any deviation present from coincidence of the two pulses. If there is such a deviation, the servo control generates an error signal to regulate the motor speed, and hence the drum velocity, to alter this velocity until the once per revolution pulse received from the optical tachometer and the incoming sync pulse are coincident. When they are coincident, phase lock has occurred. Once the drum is in phase lock with the incoming sync signal, the high density feed control track becomes the control of primary concern for the drum velocity, although phasing control is excercised throughout the operation of the drum in the event that there is any deviation from coincidence.

The loading and unloading of the storage medium on the record drum 44 is controlled by the system control electronics 74 shown in greater detail in FIG. 10, which will be described in greater detail hereinafter. Suffice it to say at this point that the system control electronics 74 initiates certain functions in the loading and unloading operation at specific points in the rotation of the drum 44 in accordance with information supplied from the optical tachometer 72 and from the processor 52, the processor 52 providing information indicative of the processing temperature within the processor 52, which temperature is sensed and controlled by means of a feedback temperature sensitive control network 76 which supplies a temperature indication signal to the system control electronics 74.

Figure 2:
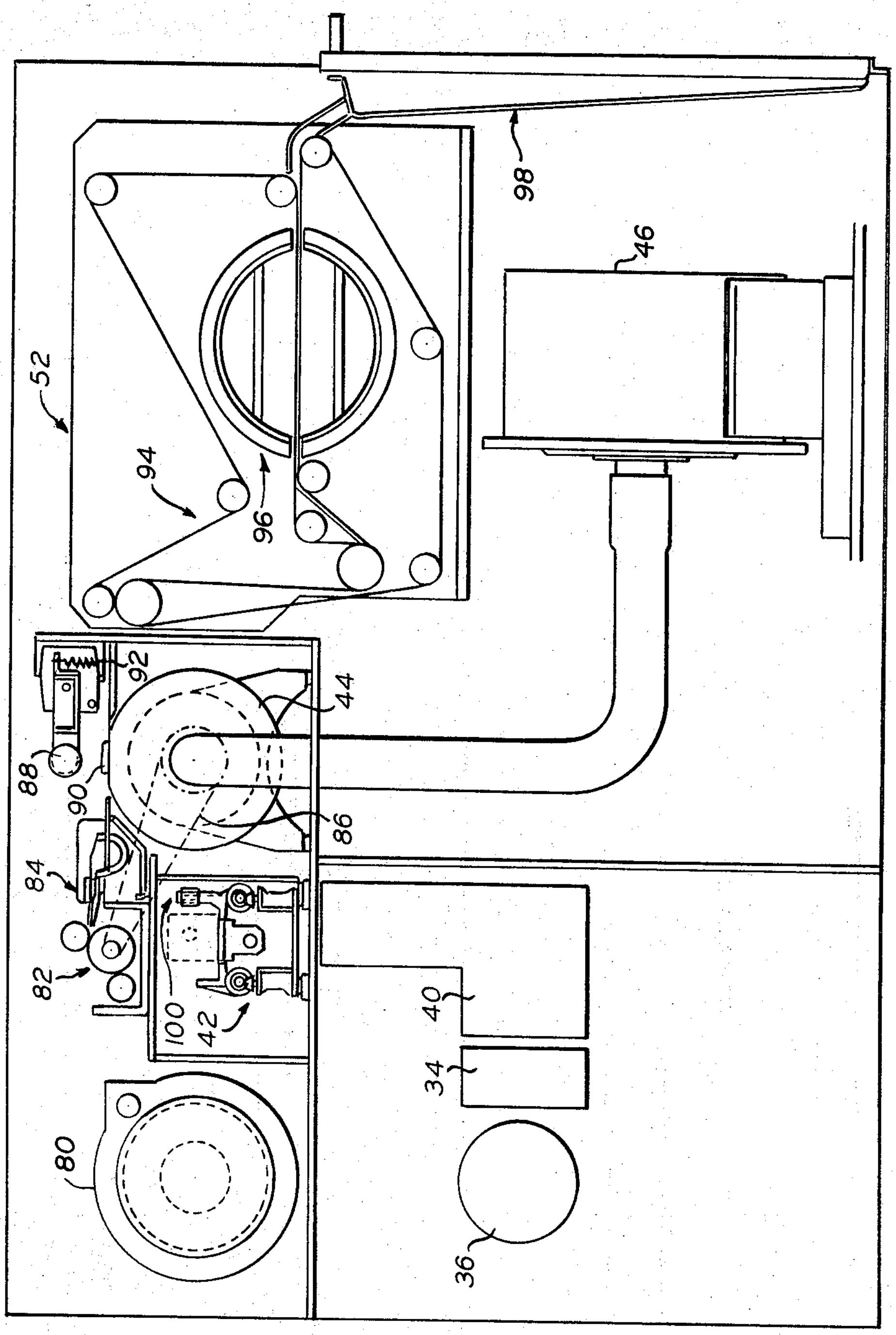
FIG. 2 is a diagrammatical illustration of the preferred embodiment of the recorder/processor shown in block in FIG. 1.

Now referring to FIG. 2, a preferred arrangement of the various portions of the preferred embodiment of the recorder/processor system 20 is diagrammatically illustrated. As shown and preferred, the storage medium, which may preferably be a thermally processable dry silver film, such as manufactured by Minnesota Mining and Manufacturing under numerical designation 786, or a dry silver paper such as manufactured by Minnesota Mining and Manufacturing under numerical designation 774, is preferably contained in a roll of unexposed film or paper which is preferably contained in a supply cassette 80. The storage medium is threaded from the supply cassette 80 to a storage medium transport system, which will be described in greater detail hereinafter with reference to FIG. 5, which preferably includes a loading capstan-drive roller assembly 82, to a cutter module 84 which cuts a predetermined quantity of the storage medium supplied from the supply cassette 80 by means of the loading capstan assembly 82. The loading capston drive roller 82 is preferably operatively connected to the record drum drive motor 70 by means of an endless belt chain-drive 86 so as to couple the loading capstan drive and the record drum drive motor 70 together during the loading of the storage medium on to the record drum 44.

As will be described in greater detail hereinafter with reference to FIGS. 5 and 9, the record drum 44 assembly also includes a pinch roller or ironing roller 88 for smoothing the storage medium on to the record drum 44 outer surface so as to provide a substantially uniform contact between the storage medium and the drum outer surface. A hold-down clamp 90, which will be described in greater detail with reference to FIG. 9, is provided on the drum 44 for clamping and holding the storage medium on the drum during the loading thereof. As was previously mentioned, and as will be described in greater detail with reference to FIG. 9, the vacuum system 46 associated with the record drum 44, provides a negative pressure to the interior thereof through vacuum grooves (see FIG. 9) so as to hold the storage medium on the drum outer surface during recording by means of suction or vacuum pressure. A peel-off knife assembly 92 is operatively associated with record drum 44 between the record drum 44 and the thermal processor 52 in order to aid in removing the recorded storage medium from the record drum after the completion of recording thereon, as will be described in greater detail hereinafter. As will be described in greater detail hereinafter with reference to FIG. 3 and FIG. 4, the peel-off knife assembly 92 unloads the storage medium from the drum 44 and feeds the exposed storage medium to the input of the thermal processor 52.

Figure 3:
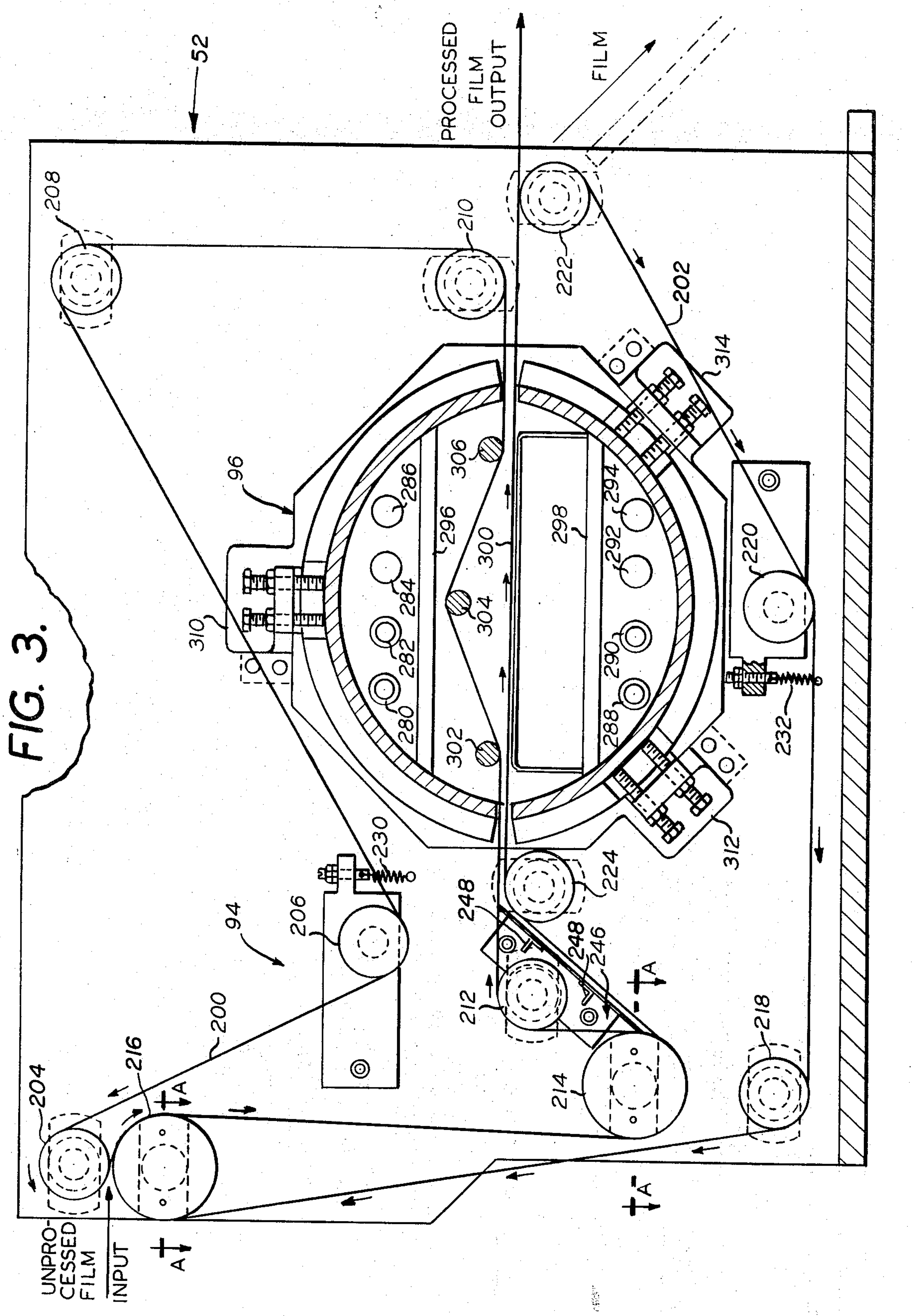
FIG. 3 is a diagrammatical illustration, partially in section, of the processor portion of the embodiment shown in FIG. 2.

As is shown schematically in FIG. 2 and in greater detail in FIG. 3, the preferred thermal processor 52 includes a conveyor assembly 94, a processing chamber 96, and a cooling chamber 98 operatively associated with the exit opening of processing chamber 96 and forming a receptacle or tray for the completely processed actual displayable image storage medium. The peel-off knife assembly 92 is operatively associated with the conveyor assembly 94 of the thermal processor 52 so as to feed the exposed storage medium into the conveyor assembly 94 which thereafter conveys the exposed storage medium containing the latent image thereon to and through the processing chamber 96 whose interior is at the proper processing temperature for the storage medium being utilized. The latent image is then developed within the processing chamber 96 dur to the controlled application of heat by thermal conduction, as will be described in greater detail hereinafter with reference to FIG. 3, and is conveyed therefrom by conveyor assembly 94 to the cooling chamber or receptacle 98.

As was previously mentioned, the storage medium contained on the record drum 44 outer surface is preferably exposed by means of an intensity modulated laser beam provided by means of laser source 36, modulator assembly 34, and the laser optical system 40, the latter which transmits the intensity modulated laser beam to the lens carriage 42 which focuses the intensity modulated laser beam via a lens arrangement 100, as will be described in greater detail with reference to FIGS. 6 and 8, to form a recording spot on the storage medium located on record drum 44. The lens carriage housing and drive means are illustrated in greater detail in FIGS. 7 and 8 and will be described in greater detail hereinafter with reference thereto as will the preferred record scanning relationships between the record drum 44 and the lens carriage 42 which form the raster scan generation portion of the record/processor system 20 of the present invention.

STORAGE MEDIUM TRANSPORT SUBSYSTEM

Figure 5:
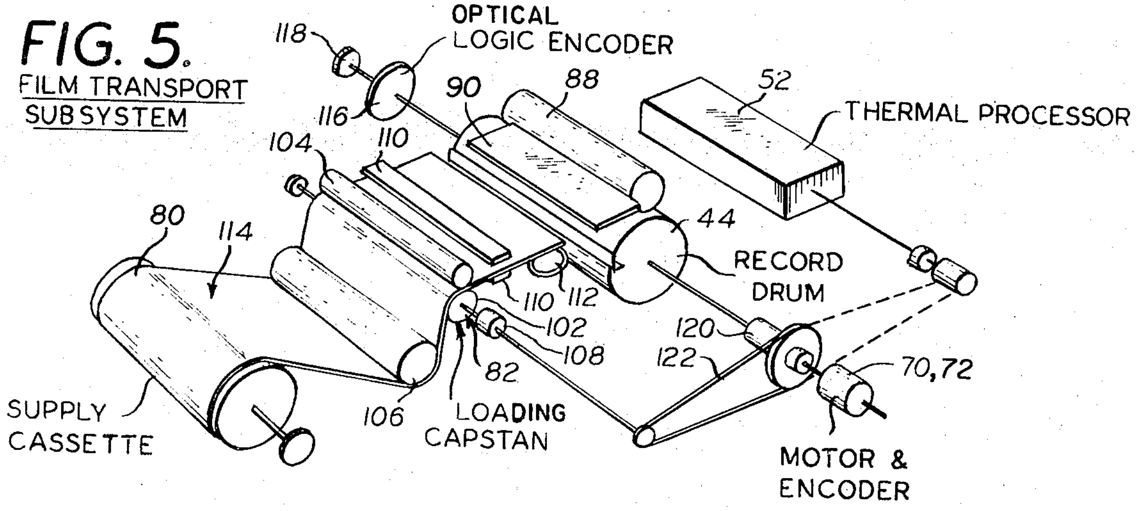
FIG. 5 is a schematic illustration of the storage medium transport subsystem of the embodiment shown in FIGS. 1 and 2.

Referring now to FIGS. 5 and 9 describing in greater detail the storage medium transport subsystem including the record drum 44 which preferably functions both as a record drum and a prime mover for the loading operation associated with the storage medium transport subsystem. Referring initially to FIG. 5, as was previously mentioned, the storage medium 114 is supplied preferably from a roll contained in supply cassette 80 which is preferably a light-tight protective canister for the recorder/processor recording material supply and which is preferably easily removable from the recorder/processor system housing for purposes of dark room loading so as to permit daylight loading of the system 20 although, if desired, the cassette 80 need not be removable. The loading capstan assembly 82 preferably includes a drive roller 102, a pinch roller 104 and an idler roller 106. The drive roller 102 is preferably chain-driven through a timing sprocket by the record drum 44 drive motor 70 during loading operations. Preferably, the drive geometry is established to produce equal tangential velocities of the drive roller 102 and the record drum 44. As shown and preferred, a clutch coupling 108, 120, 122 is provided to ensure that the drive roller 102 is isolated from the record drum 44 at all times except during the loading of the storage medium. A drag brake 118 is preferably utilized to hold the proper tension on the storage medium as it is transferred. The pinch roller 104 is preferably unlatched, such as manually, during the threading of the storage medium and all threading is accomplished by simply pushing the storage medium from the cassette 80 side into the loading capstan assembly 82.

As shown and preferred in FIG. 5, feeder guides 110 and an exit plate 112 are utilized to ensure the proper passage of the storage medium during threading. The storage medium 114 is preferably threaded from the supply cassette 80 under the idler roller 106, between the pinch roller 104 and the drive roller 102, through the feeder guides 110 to the exit plate 112 which is operatively associated with the cutter assembly 84 (see FIG. 2), which has been omitted from FIG. 5 for purposes of clarity. As will be described in greater detail with reference to the system control electronics 74 (FIGS. 10A and 10B), upon initiation of the loading cycle, the control electronics 74 establishes the record drum 44 position through the logic optical encoder 116 and sets the proper time for energizing the record drum 44 clutch and the loading capstan drive roller 102 and clutch coupling 108, 120, 122. At that time, which corresponds to a specific record drum 44 position, the clutch and coupling 108, 120, 122 are energized and the loading capstan assembly 82 pulls the storage medium from the supply cassette 80. Preferably, the associated timing logic is such that when the hold-down clamp 90 (FIGS. 2 and 9) on the record drum 44 is at top-vertical the record drum 44 is decelerated to rest by the electromagnetic drum brake 118 (FIG. 9), the vacuum subsystem 46 is energized, and the leading edge of the storage medium is in position to be clamped to the drum 44. The system control electronis 74 then actuates the clamp motor (not shown) to close the clamp 90, lowers the ironing roller 88 into position, and sets the record drum 44 into motion preferably at a low speed such as ten revolutions per minute.

Preferably, after the drum 44 rotates approximately 280°, the associated logic optical encoder 116 again causes the drum brake 118 to be engaged. At this point, the cutter assembly 84 is preferably actuated and the record drum clutch and loading capstan clutch coupling 108, 120, 122 are deenergized. The drum 44 is then caused to resume its rotation until the clamp 90 again reaches its top-vertical position at which time the ironing roller 88 is raised to its stowed position. At this point the storage medium has been loaded on the record drum 44 and the record function may be initiated. The storage medium cutter assembly 84 preferably consists of a solenoid actuated shear having a rake angle of preferably two and a half degrees by way of example and not limitation. When the proper length of storage medium has been advanced it is firmly held by a linear solenoid actuated clamp while the blade of the shear is rotated by a rotary solenoid clamp (partially shown in FIG. 2).

Referring once again to FIG. 9, the record drum 44 assembly preferably includes the drive motor 70 which is preferably a DC torquer and the optical tachometer or encoder 72 which is utilized in conjunction with the servo control network 66 and timing system 68 to regulate and synchronize the drum 44 velocity. As was previously mentioned, in addition, logic optical encoder 116 is located on the drum 44 drive shaft connected to the motor 70 as is the record drum clutch 120 and chain drive 122 for the load capstan assembly 82. The electromagnetic clutch 120 is not necessary in the preferred embodiment as its function is to decouple the loading capstan drive chain 122 from the processor synchronizing chain (shown in dotted lines) when a platen type processor is utilized in place of the preferred conveyor means thermal processor shown in FIGS. 2 and 3, such decoupling occurring during the recording mode, the processor synchronizing chain for the platen processor being utilized to drive the exposed storage medium through the processor 52. The record drum 44 itself preferably includes a plurality of vacuum grooves 124 on the outer surface thereof in order to hold the storage medium firmly to the drum 44 by a negative pressure in the drum interior caused by the vacuum system 46 during the loading operation and also during recording.

As was previously mentioned, as the storage medium is loaded on to the drum 44, it is ironed flat by the solenoid actuated ironing roller 88 which eliminates the possibility of air entrapment between grooves 124. Preferably, the hold-down clamp 90 is also utilized to assure storage medium hold-down during any high speed recording. The clamp 90 is preferably dynamically unbalanced to cause a dynamic clamping force increase due to centrifugal force. The clamp 90 is statically held open or closed preferably by an "over center" spring and pivot mechanism (not shown) and the open or closed state can be changed, preferably, only when the drum position has the clamp 90 at top-vertical, which is considered the zero drum position. Furthermore, as was also previously mentioned, the clamp 90 in conjunction with the peel-off knife assembly 92 locally forces the storage medium leading edge off the drum 44 when the clamp 90 is opened after recording. The logic encoder 116, as was previously mentioned, is utilized as the drum position transducer during the loading and unloading functions and as a once per revolution pulse generator. As was also previously mentioned, the brake 118 is preferably an electromechanical friction brake that engages when the coil is energized to decelerate or stop the drum 44.

LASER OPTICAL PROCESSING SYSTEM

Figures 4, 6:
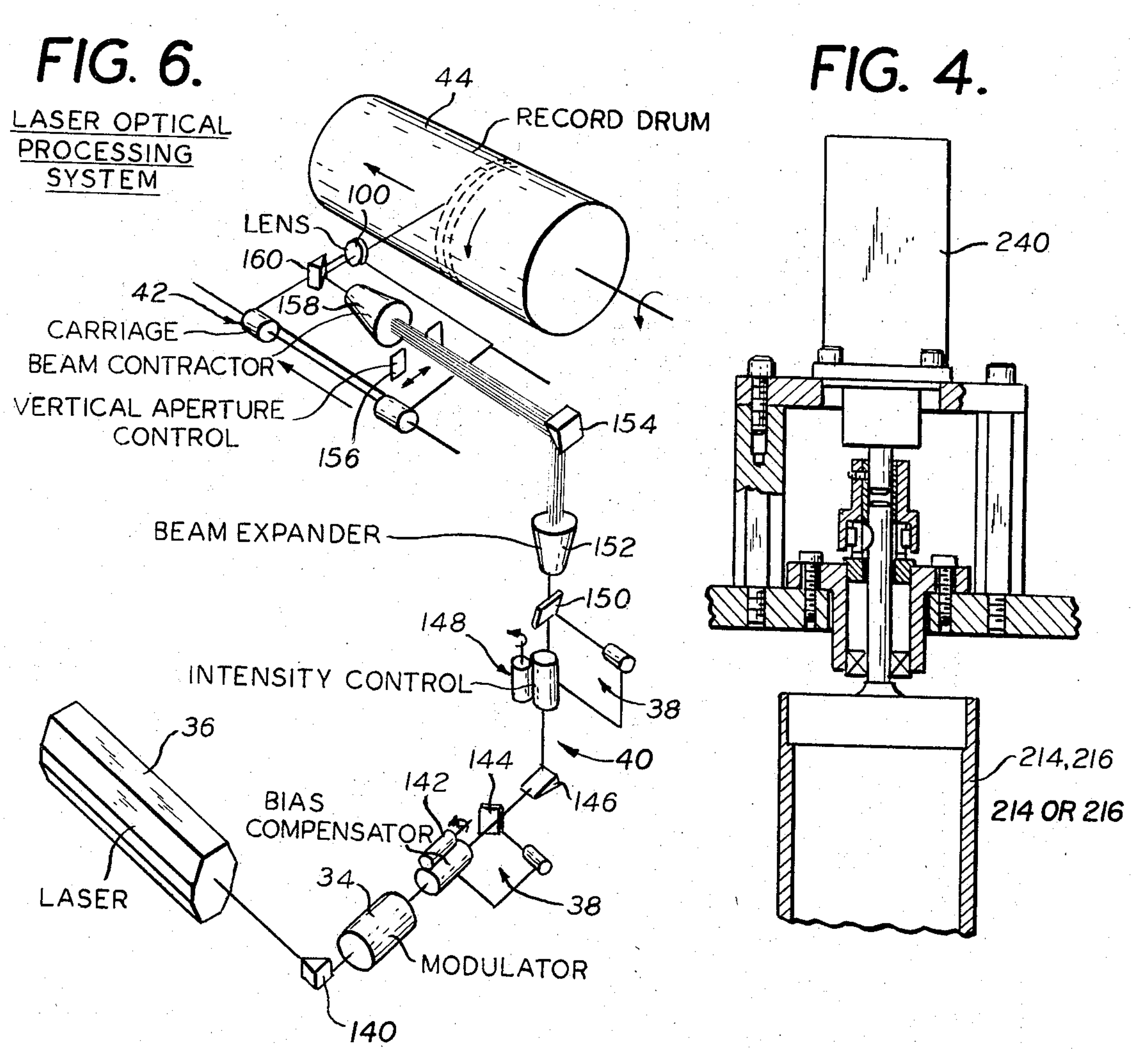
FIG. 4 is a section view of a typical drive roller of the processor shown in FIG. 3 taken along line 4—4.
FIG. 6 is a schematic illustration of the laser optical processing subsystem of the embodiment shown in FIGS. 1 and 2.
Figures 7, 8, 9:
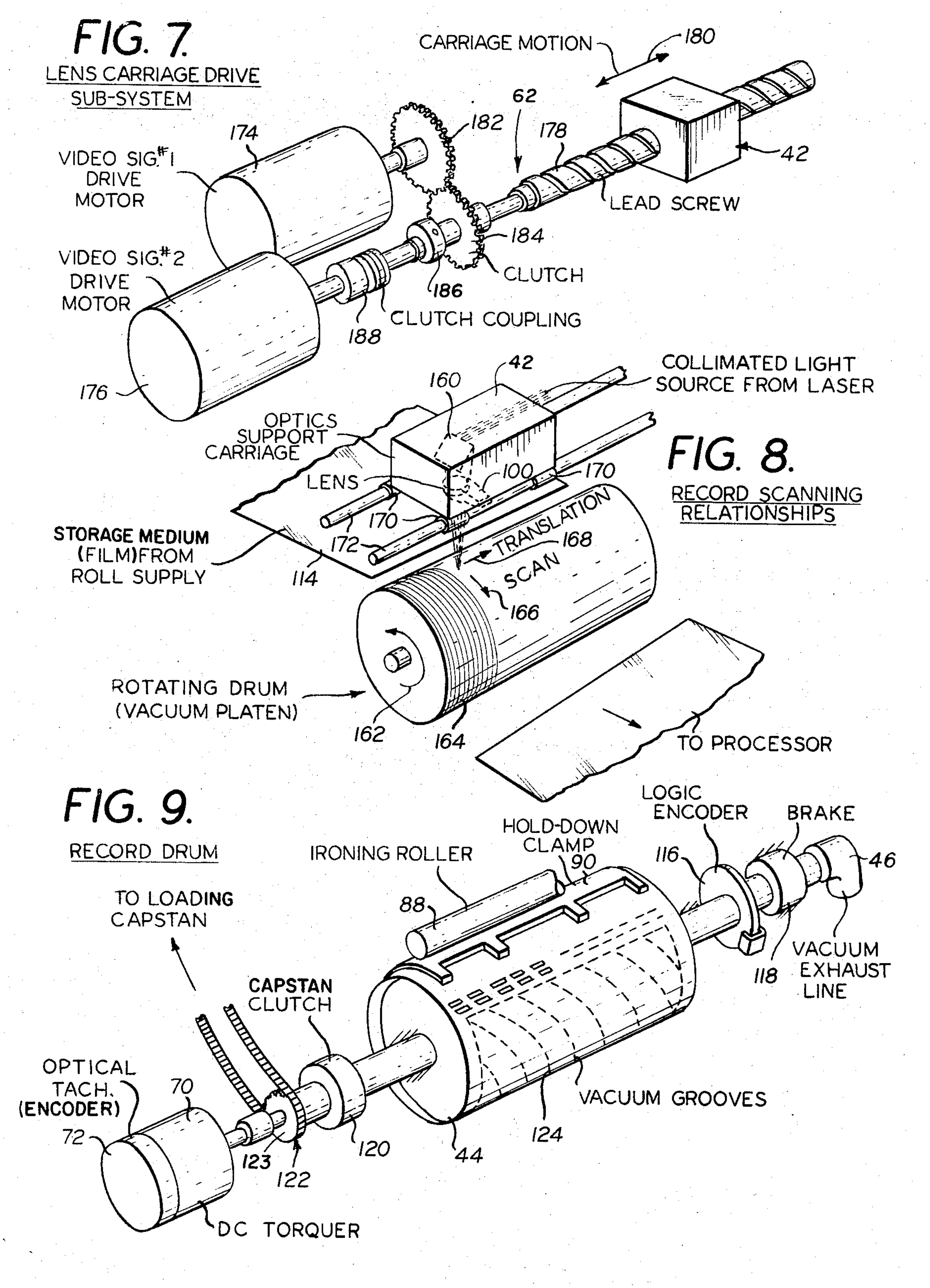
FIG. 7 is fragmentary schematic illustration of the lens carriage drive subsystem of the embodiment shown in FIGS. 1 and 2.
FIG. 8 is a schematic illustration of the record scanning relationships in the embodiment shown in FIGS. 1 and 2.
FIG. 9 is a schematic illustration of the record drum assembly portion of the embodiment shown in FIGS. 1 and 2.

Referring now to FIG. 6, the laser optical processing system which includes laser 36, modulator assembly 34, and the laser optical system 40, now will be described in conjunction with the lens carriage assembly 42. The laser optical processing system is responsible for the delivery of a collimated light bundle, with the proper intensity and modulation, from the laser 36 to the lens carriage assembly 42. The laser optical processing system will be described in terms of following the optical path from the output light beam from the laser 36 to the focused recording spot on the record drum 44 by means of lens carriage 42. Preferably, due to considerations of system size, the output laser beam 36 is directed to a conventional simple mirror element 140 which is a conventional fold mirror utilized to fold the incident beam 90° for packaging convenience. The folded beam is then directed to the conventional modulator assembly 34 which is preferably a transverse field modulator, which is an electro-optical light modulator which varies the intensity of the laser beam as a direct function of the incoming video signal. The modulator assembly 34 is preferably comprised of two identical 45°-X-cut ammonium dihydrogen phosphate crystals with a half wave plate between them to eliminate the effects of natural birefringence. This structure is preferably mounted in a thick walled metal cylinder, such as aluminum, which, together with an anti-reflective coating and a low absorption index matching fluid, provides for efficient and effective operation in the recorder/processor system environment.

The modulated laser output is then directed to a bias compensator 142 which is preferably a conventional Senarmont compensator utilized to provide a null setting of the modulator for the no-voltage condition. This bias compensator 142 forms one portion of the drift control network 38 previously referred to in FIG. 1. Any drift in the quiescent operating point of the transverse modulator 34 such as encountered as a result of temperature variations due to ambient fluctuations and/or dielectric heating of the crystals is compensated for by means of bias compensator 142 which is utilized to hold this drift at an acceptable level. The output of the bias compensator 142 is fed back to the bias compensator by means of a conventional beam splitter 144 which provides the other portion of the split beam to another conventional 90° folding mirror 146, once again provided for packaging convenience, whose output is fed to an intensity compensator 148 which forms the other portion of the drift control network 38. The intensity compensator 148 is a conventional control mechanism that provides continuous monitoring and amplitude control of laser intensity and not only compensates for long term drift of the laser, but also allows intensity settings to correspond to storage medium sensitization. The output of the intensity compensator 148 is fed back to the intensity compensator by means of a conventional beam splitter 150, the other portion of the beam splitter output being directed to a conventional beam expander 152. Preferably, the beam expander 152 expands the diameter of the entrant beam to improve upon the beam divergence which might otherwise be a cause for concern when the lens carriage 42 length of travel is large, such as 22 inches. Preferably, the beam is expanded 8:1 from its original nominal diameter. The output of the beam expander 152 is directed to another conventional fold mirror 154 which folds the expanded beam 90° into the optical axis of the lens carriage 42.

The lens carriage 42 is preferably comprised of the optical elements necessary to form the recording spot. These elements are the vertical aperture control 156, a beam contractor 158, which is preferably 8:1 so as to contract the expanded beam back to its original size, a fold mirror 160 which folds the beam 90° towards the record drum 44 rotational axis and a conventional laser object lens 100, such as a Tropel lens, which focuses the laser beam to a spot on the surface of the recording drum 44. Summarizing the optical path of the beam through the lens carriage 42, the beam is directed from fold mirror 154 to the vertical aperture control 156, which preferably adjusts the spot size and aspect ratio to provide ripple-free recording, and therefrom to the beam contractor 158. The output of the beam contractor 158 is directed to the fold mirror 160 which folds this output beam 90° towards the record drum rotational axis into the focusing lens 100 which focuses the laser beam to a spot on the surface of the recording drum 44.

The record scanning relationship between the drum and the lens carriage are shown in FIG. 8. The collimated light source from the laser 36 is focused as a recording spot on the drum 44 which is rotated in the direction indicated by arrow 162 so as to form a scan line 164, one scan line being formed in the time between two horizontal sync pulses from the incoming video signal. The direction of raster scan is indicated by the arrow 166 labeled SCAN. The lens carriage 42 is translated in the direction indicated by the arrow 168 labeled TRANSLATION, the direction of translation being substantially along an axis parallel to the record drum axis of rotation so as to focus the modulated laser source at a different spot on another scan line translated substantially normal to the first spot scan line in order to generate the plural line raster scan. Preferably the lens carriage 42 is suspended on linear ball bushings 107 which, in turn, are supported by a pair of precision, hardened rails 172, the rail system maintaining the scanning spot position over the entire translation of the carriage 42. The lens carriage 42, as will be described in greater detail hereinafter, is preferably stepped in precise increments dictated by the particular rate of scan of the incoming video signal.

LENS CARRIAGE DRIVE SUBSYSTEM

Referring now to FIG. 7, the lens carriage drive subsystem 62 shall be described in greater detail hereinafter. As was previously mentioned, the lens carriage drive subsystem 62 preferably includes a pair of drive motors 174 and 176, drive motor 174 being associated with the scan rate of VIDEO SIG. 1 as determined by the carriage drive control 61, and drive motor 176 operating at the scan rate associated with VIDEO SIG. 2 as determined by the VIDEO SIG. 2 carriage drive control 64, the scan rate being determined by the timing between horizontal sync pulses associated with the particular composite incoming video signal. Of course, if desired, a single multispeed motor could be utilized in place of the pair of motors 174, 176 or, in the event that only one incoming video signal is utilized, or only one scan rate is of concern, only a single motor could be utilized and the other motor omitted. As shown and preferred in FIG. 7, a stepping motor-precision lead screw combination is utilized to precisely step the lens carriage 42. The pitch of the lead screw 178 upon which the lens carriage 42 is threadably mounted for translational motion in the directions indicated by arrow 180 in conjunction with the rotation of the lead screw 178, and the basic stepping increment provided by the associated motor 174 or 176 are preferably fixed and are equal to whole number multiples of the basic scan pitch.

Since we have assumed for purposes of illustration that the pitch requirement associated with the two incoming video signals are not integrally related, although as was previously mentioned, the system of the present invention is operable if they are integrally related, a dual drive train comprising gears 182 and 184 and electromagnetic clutches 186 and 188, is utilized. For purposes of illustration, when drive motor 176 is utilized to drive the lead screw 178 so as to incrementally advance the carriage 42 in response to the input scan rate of VIDEO SIG. 2, gears 182 and 184 are not engaged. In the alternative, when motor 174 is utilized to drive the lead screw 178 so as to incrementally advance the lens carriage 42 in response to the input scan rate of the incoming VIDEO SIG. 1 signal, drive motor 176 is not turned.

THERMAL PROCESSOR

Now that the film loading, recording and unloading assemblies have been described, the thermal processor 52 for processing the exposed latent image contained on the storage medium 114 will be described with reference to FIGS. 3 and 4. The thermal processor 52, as was previously mentioned, preferably includes a conveyor system 94 and a processing chamber 96. The cooling chamber 98 associated with the output of the processing chamber 96 has been omitted from FIG. 3 for purposes of clarity.

The conveyor system 94 of the thermal processor 52 preferably includes a pair of low mass material endless belts, such as a nylon material manufactured under the trade name Nomex. For purposes of explanation, the pair of endless belts, are described as an upper belt 200 and a lower belt 202. The exposed storage medium is preferably carried between the upper and lower belts 200 and 202, respectively, in order to convey the exposed storage medium having the latent image recorded thereon to the processing chamber 96 for processing in a manner to be described in greater detail hereinafter. The conveyor system 94 preferably include rollers 204, 206, 208, 210 and 212 for the upper belt alone; rollers 214 and 216 for the combined upper and lower belts having the exposed storage medium transportable therebetween; and rollers 218, 220, 222 and 224 for the lower belt alone. Roller 206 is a tension roller which maintains tension on the upper belt 200 by means of an adjustable spring loading mechanism 230 and, similarly, roller 220 is a tension roller which maintains tension on the lower belt by means of spring loading mechanism 232. The tension on the belts is adjusted by means of rollers 206 and 220 so as to be sufficient to hold the exposed storage medium between the upper and lower belts while the storage medium is being conveyed to the processing chamber 96. Upper belt 200 and lower belt 202 are preferably both positively driven by means of positively driven rollers 216 and 214 which are each driven by means of a separate drive motor 240 shown in FIG. 4. The combined upper belt-exposed storage medium-lower belt combination is conveyed between positive drive rollers 216 and 214 to a separator housing 246 which includes upper belt roller 212, lower belt roller 224 and the storage medium guide 248 which prevents curl-up of the storage medium on the lower belt 202 at the point of belt separation.

The processing chamber 96 is preferably of the thermal conduction type which heats the air within the chamber to a desired processing temperature. The air is heated from opposite sides of the chamber by means of heating rods, such as Calrod heating rods, four such rods 280 through 286, inclusive, being shown for the upper portion of the chamber and four such rods 288, 290, 292 and 294 being shown for the lower portion of the chamber, and respective diffuser plates 296 and 298 spaced from the rods so as to prevent any radiant heat from entering the space between the diffuser plates 296 and 298. The heating of the air is accomplished by the heating of the diffuser plates 296 and 298. The spacing between the diffuser plates 296 and 298 is large so as to provide a large air volume with respect to the latent image volume and create a thermal inertia. The lower belt 202 upon which the exposed storage medium is contained when the storage medium is conveyed through the processing chamber 96 is guided through the chamber over a thin platen 300, such as sheet metal, which is slightly curved at the ends, in order to flatten the lower belt 202 during its passage through the processing chamber 96. At no time does the film touch the platen 300, just the lower belt 202. The interior walls of the chamber 96 are preferably composed of a non-reflective metal such as non-reflective aluminum. The upper belt 200 is guided through the chamber via guides 302, 304 and 306 which guide the upper belt 200 away from the lower belt 202. As shown and preferred in FIG. 3, the processing chamber 96 preferably includes a plurality of adjustment means 310, 312 and 314 located about the periphery of the chamber 96, the adjustment means preferably including adjustable locking screws for aligning the oven with respect to the upper and lower belts 200 and 202, respectively, during set up of the conveyor system 94.

Preferably, conveyor system 94 provides a lengthy return path for the respective belts 200 and 202 so as to aid in the cooling of the belts, (the storage medium preferably not adhering to a cool belt) the belts preferably staying substantially cool except during the actual thermal processing due to their low mass and the lengthy return path. It should be noted that although the chamber 96 is shown essentially as circular or elliptical in the view shown in FIG. 3, the shape is not critical and if desired the chamber 96 could be rectangular, the only pertinent factor being that a large air volume with respect to the volume of the storage medium be provided within the chamber interior processing portion. As was previously mentioned, the heating rods heat the diffuser plates and the diffuser plates heat the air which thermally processes the latent image on the exposed storage medium into an actual displayable image. Thermal conduction rather than direct radiant heat can cause non-linear processing due to the higher absorption of radiant heat in conjunction with higher film density. The lower belt 202 conveys the developed storage medium having the actual displayable image thereon from the processing chamber 96 over roller 222 to the cooling chamber 98.

SYSTEM CONTROL ELECTRONICS

Figure 10A:
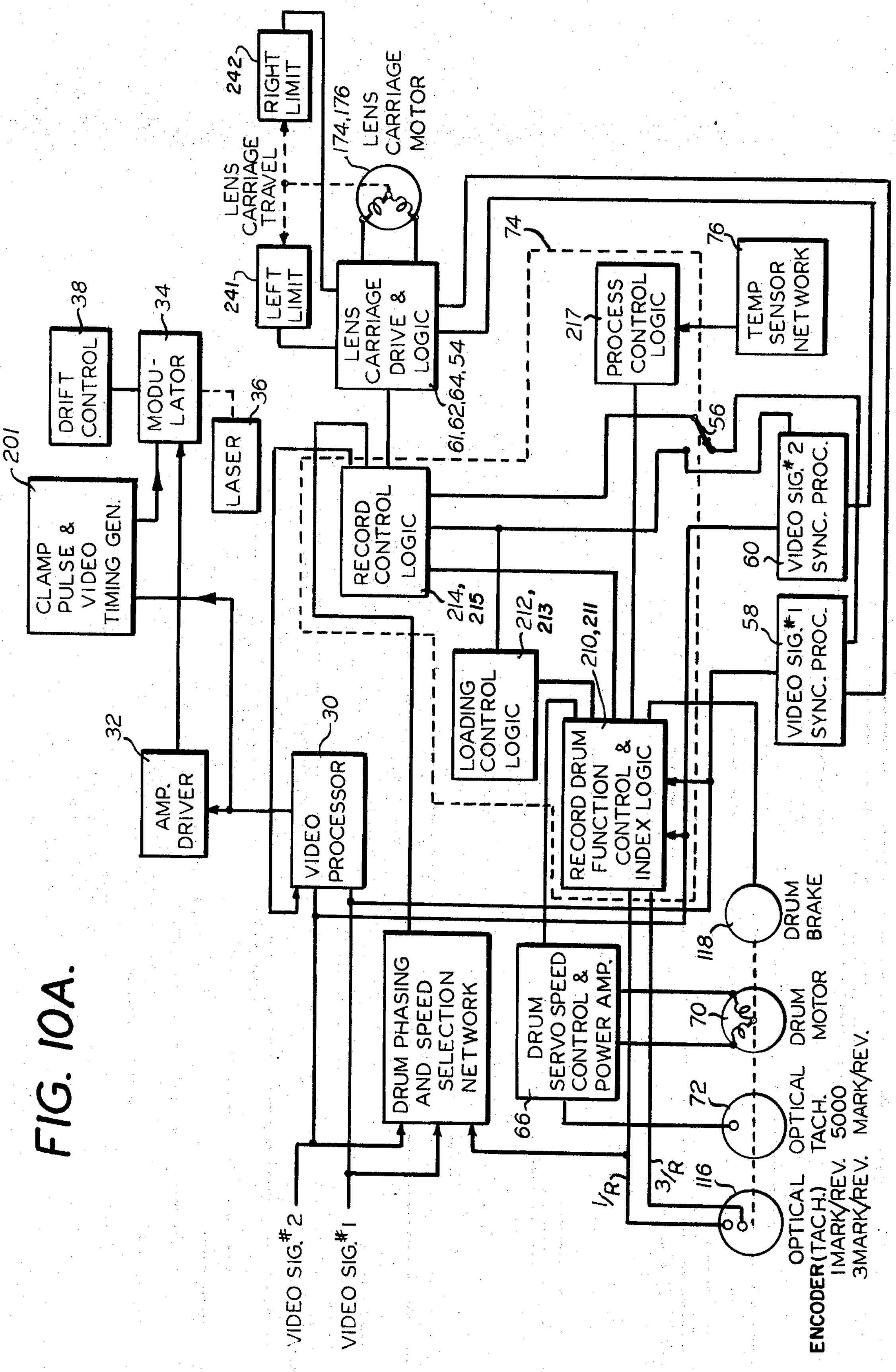
FIGS. 10A and 10B are functional schematic diagrams of the system control electronics portion of the embodiment shown in FIG. 1.
Figure 10B:
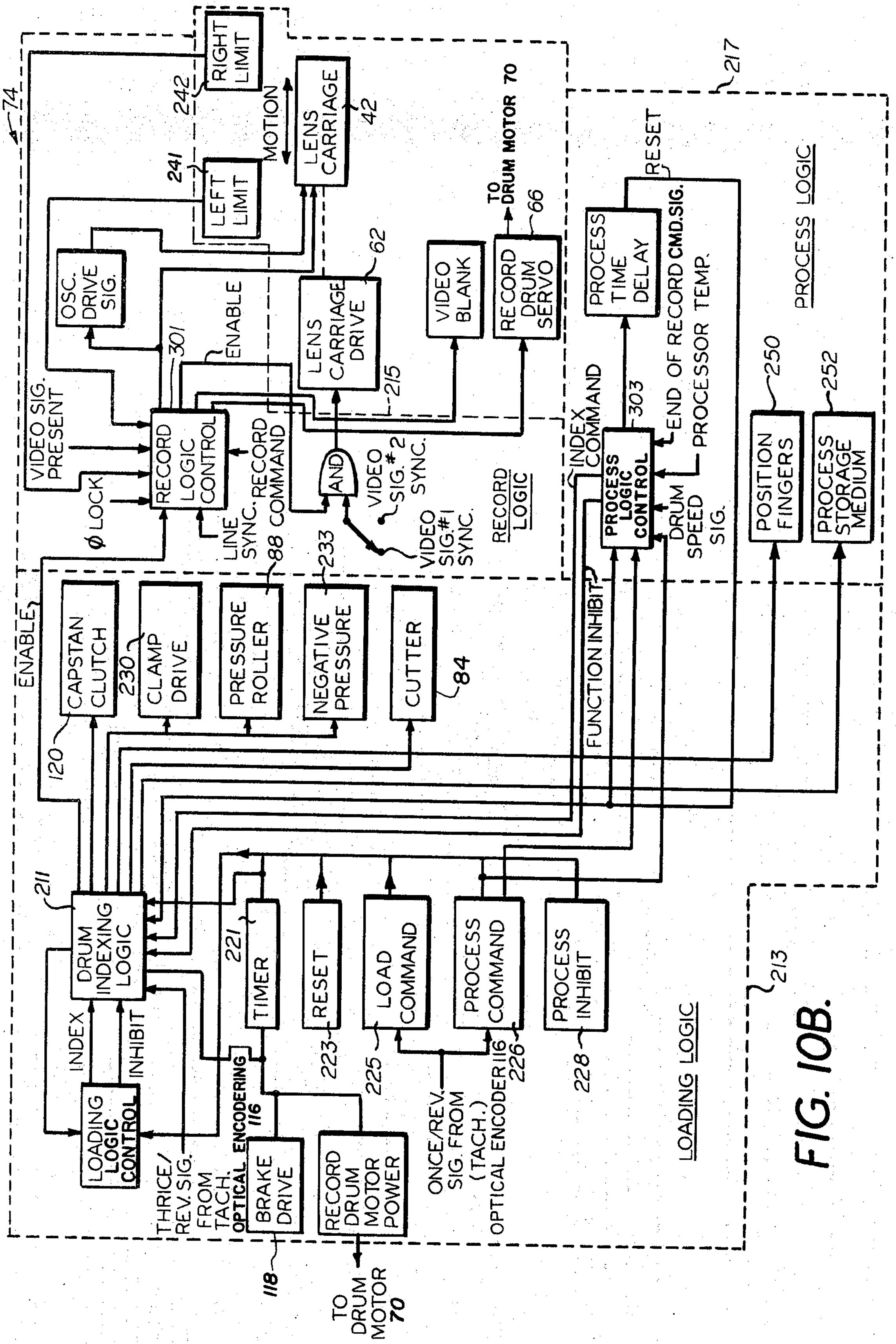

Referring now to FIGS. 10A and 10B, the system control electronics 74 which control the loading and unloading of the storage medium in the recorder/processor system 20 of the present invention, will now be described in greater detail. Referring initially to FIG. 10A, a block diagram of the recorder/processor system 20 electronics is shown. As was previously mentioned, the video processor portion 30 of the system 20 processes the video input signal in conventional fashion to correct for any non-linearity in the system as well as to enhance the recorded image, if desired. The amplifier driver 32 associated with the video processor 30, as was also previously mentioned, increases the power level of the signal in order to drive the modulator 34 associated with the laser 36, the modulator 34 utilizing feedback for correcting for any non-linearity in the operation of the modulator, as was explained with reference to FIG. 6.

As is shown and preferred in FIG. 10A, a clamping pulse and video timing generator 200 is utilized in conjunction with the video processor 30 and modulator assembly 34 in order that the circuits may be DC restored and corrections made during video blanking. The circuit arrangement illustrated in FIG. 10A is basically identical with that shown and previously described with reference to FIG. 1, with the additions mentioned above, and with the exception that the system control electronics 74 is shown in greater detail as comprising a drum indexing logic portion 210, a loading control logic portion 212, a recorder control logic portion 214 and a process control logic portion 216, the drum indexing logic portion 210 cooperating with the respective loading, recording, and processing control logic portions 212, 214 and 216, respectively, to load the record drum 44, record the incoming video information on the loaded storage medium so as to produce a latent image thereon, and process the latent image to produce an acutal displayable image therefrom. The logic circuitry which comprises each of the respective logic portions 210, 212, 214 and 216 is preferably conventional and will not be described or shown in greater detail except as to a description of the functional operation of the various logic portions 210, 212, 214 and 216 of the system control electronics 74 with reference to FIG. 10B which is a functional block diagram of the system control electronics 74.

As was previously mentioned, the loading of the storage medium on to the drum 44 requires that the drum initiate certain functions at specific points in its rotation, the initiation of the required functions being controlled by optical encoder 116 which preferably has a track having three marks per revolution for controlling the sequence of the required functions and another track having one mark per revolution for indicating the start of sequence and for indicating phase lock for the incoming sync signal. Prior to initiation of the loading sequence, several initial conditions must be met. These initial conditions, which are functionally illustrated in FIG. 10B, are timer 220 which indicates that a sufficient warmup time has passed so as to permit complete operation of the recorder/processor apparatus 20 to occur from loading through processing; reset 222 which indicates that the lens carriage 42 has been reset to the start position; load command 224 or process command 226 which indicates that loading or processing is to commence; and process inhibit 228 which prevents processing from occurring until this signal is removed. The loading function or load command 224 is initiated by receipt of the once per revolution signal from the optical encoder or tachometer 116, as indicated in FIG. 10B. Receipt of these signals preconditions the conventional loading logic network 212 to initiate the loading function by supplying a signal to the drum indexing logic 210. Once the loading function is initiated in this manner, the thrice per revolution signal received from the optical encoder or tachometer 116 initiates the required sequence of functions to load the drum 44 via conventional drum indexing logic 210 which supplies the control signal to the electromagnetic capstan clutch 120 to engage the capstan clutch; a signal to the drum motor driven from the brake 118 to stop the drum 44 in the zero position; that is with the clamp 90 at top-vertical which corresponds to one revolution as indicated by the once per revolution signal from encoder 116; a signal to the clamp 90 motor (not shown) to cause the clamp 90 to clamp the leading edge of the storage medium, represented by the functional notation clamp drive 230; a signal to pressure roller or ironing roller 88 to engage the pressure roller 88; a signal to the vacuum system 46 to engage the negative pressure system and create a negative pressure within the interior of the drum 44, this command being indicated by the block "negative pressure" 232. Thereafter, the drum indexing logic 210 supplies a signal, when the previous conditions are met, to the record drum motor 70 and to the brake 118 to release the brake and to start the drum 44 rotating again. After the drum 44 has rotated approximately 280°, as indicated by optical encoder 116, a signal is supplied to the drum indexing logic 210 which, thereafter, applies a control signal once again to the brake drive 118 and drum motor 70 to stop the drum. After the drum 44 is stopped a signal is supplied to the cutter solenoid 84 to engage the cutter and cut the storage medium by rotation of the shear blade associated with cutter 84. Thereafter, the drum indexing logic 210 supplies a signal to the brake drive 118 and the drum motor 70 to start the drum rotating again to complete the revolution of the drum 44, thereby moving the now trailing edge of the loaded storage medium on to the drum 44 and completing the loading sequence.

At the completion of the loading sequence, the drum indexing logic 210 sends an enable signal to the record logic control 214, and also provides a control signal to the record drum motor 70 to accelerate the drum to the record speed selected. The record/processor system 20 is now in the record standby mode indicating that all subsystems are ready for the record function. Before the recording function can be initiated, several initial conditions must be met in the record logic 214. These initial conditions are as follows: the enable signal from the loading logic 212 signifying that the loading function is complete must be received; the control signal indicating that a video signal is present must be received; a signal indicating that phase lock has occurred between the incoming sync signal and the once per revolution signal from encoder 116 associated with drum 44; a record command signal must be received; a line sync signal must be received; and a recording spot enable signal must be received. When these initial conditions are met, the record logic control 214 supplies a control signal to the record drum servo 66 to cause the motor 70 to accelerate the drum 44 to the selected record speed; and supplies a control signal to the lens carriage drive 62 to cause the lens carriage drive to step in accordance with receipt of the incoming sync signal, the lens carriage 42 stepping function being initiated by the once per revolution portion of the encoder 116. The recording sequence may be ended either by receipt of an end recording signal by the record control logic 214 or by receipt of control signal from either the left limit carriage switch 240 or the right limit carriage switch 242 indicating that the lens carriage 42 has translated completely to the left end of the track upon which it travels or completely to the right end of the track upon which it travels. In addition, at the completion of the recording function, a reset signal is supplied to the lens carriage drive 62 to reset the lens carriage 42 to its start position.

When the recording function is ended, the record drum 44 preferably is decellerated to the previously mentioned low speed utilized for loading and unloading by the transmission of a control signal from the record logic control 214 to the record drum servo 66 to cause this decelleration, thereby placing the system 20 in the process standby mode until receipt of a process command signal 226.

The system 20 is now ready for processing of the latent image into an actual displayable image. Preferably, before such processing can occur, several initial conditions must be met for the process logic 216. These initial conditions which must be satisfied before the processing sequence can be enabled, are receipt of an end of record command signal; receipt of a drum speed signal indicating record drum rotation at the low speed; and receipt of a processor up to temperature control signal from temperature sensor network 76. The processing sequence, like the loading sequence, is initiated by the once per revolution portion of encoder 116. The processing logic 216, when the previously mentioned initial conditions have been met, supplies a control signal to the drum indexing ogic 210 which in turn supplies a control signal to the record drum motor 70 to position the drum 44 in the zero position; that is, the clamp 90 at top-vertical as indicated by receipt of the once per revolution signal from encoder 116. When this condition has been met, the drum indexing logic 210 supplies a signal to the brake drive 118 to stop the drum 44. Thereafter, the drum indexing logic supplies a control signal to the clamp 90 motor to cause the clamp 90 to be opened. After this condition has occurred, the drum indexing logic 210 supplies a control signal to the peel-off knife assembly 92 to cause the insertion of the mechanical fingers between the leading edge of the storage medium and the drum 44 outer surface as indicated by the logic command "position fingers" 250 in FIG. 10B. At this point, it should be noted that preferably, the clamp 90 is designed so that when the clamp 90 is opened the leading edge of the storage medium is thereby pulled away from the drum surface. Furthermore, the drum indexing logic 210 supplies a control signal to the vacuum system 46 to shut off the vacuum system so that negative pressure (indicated by block 232 in FIG. 10B) is no longer maintained within the interior of the drum 44. After the mechanical fingers 250 have been inserted, the drum indexing logic 210 supplies a control signal to the processor drive motors 204 and 206 associated with conveyor system 94 and the exposed storage medium is transferred to the processor 52 for processing. These functions are indicated by the block labeled "PROCESS STORAGE MEDIUM" 252 in FIG. 10B. Preferably, simultaneously with the initiation of the prcessing cycle, a timer is started which, upon completion of processing, provides a reset pulse to the system control electronics 74 to reset the system 20 preferably for another recording cycle.

Summarizing the functioning of the drum indexing logic 210, the record drum 44 is indexed thereby to a given position and caused to remain in that position for a given time and then resume its original speed once the time interval has been satisfied. During the loading sequence, the drum 44 is indexed to a position and remains there for enough time so that the clamp 90 can be closed and the drum indexed to another position where the drum 44 will stop for enough time to allow the cutter 84 to cut the storage medium. In the processing mode, the record drum 44 is indexed to the top-vertical clamp position, or zero position, so that the clamp 90 can be opened to allow the exposed storage medium to be transferred to the processor 52. Thus, the drum 44 is required to index both when loading the storage medium and when the storage medium is transferred from the record drum 44 to the processor 52. Thus, the system control electronics 74 which, as was previously mentioned, is conventional, supervises the various operations occurring within the recorder/-processor system 20 of the present invention in accordance with the occurrence of preselected initial conditions and the provision of control pulses to the various portions of the record/processor system 20 in accordance therewith.

OPERATION

The operation of the recorder/processor system 20 of the present invention will now be described. As will be explained in greater detail hereinafter, the recorder/-processor system 20 of the present invention preferably utilizes a roll of unexposed storage medium contained within a supply cassette 80 for supplying a predetermined quantity of storage medium to the record drum 44 for recording. In describing the operation of the recorder/processor system 20 of the present invention, the system functions can be subdivided into three major categories which are (1) loading of the storage medium, (2) recording of the latent image on the storage medium and (3) unloading and processing of the latent image into an actual displayable image. These functions shall be discussed in this order.

The loading of the storage medium on to the record drum 44 as was previously mentioned, is controlled by the system control electronics 74 which causes the record drum 44 to initiate certain functions at specific points in its rotation. The storage medium 114 is threaded as shown in FIGS. 2 and 5, extending from the supply cassette 80 to the cutter module 84. Upon initiation of the loading cycle, the system control electronics 74 establishes the record drum 44 position by means of optical encoder 116 and sets the proper time for energizing the record drum clutch 120 and loading capstan clutch coupling 122-123. The optical encoder 116 preferably has three marks per revolution for controlling the sequence of the required functions. The optical encoder 116 also includes a once per revolution mark which marks $T_0$ at the start of the loading sequence. The record drum 44 preferably rotates at a low speed, such as approximately 10 revolutions per minute, in the loading sequence mode. When the proper conditions are satisfied in the systems control electronics 74, that is load command or process command, process inhibit, and carriage reset, the loading function is initiated by the receipt of the once per revolution pulse from the optical encoder 116. Once the loading function is initiated, the three per revolution portion of the optical encoder 116 initiates the required sequence of functions to load the drum 44 as shown in FIG. 10B. The sequence of functions is as follows:

Engage loading capstan clutch 123; stop drum 44, by means of actuating drum magnetic brake 118, in position to clamp the storage medium with the hold-down clamp 90 on the record drum 44 at the top-vertical position of the clamp 90, the record drum 44 being decelerated to rest by the electromagnetic drum brake 118; engage clamp motor (not shown) to close hold-down clamp 90 on the leading edge of the storage medium 114 supplied from supply cassette 80 via loading capstan 82; engage pressure roller 88; energize vacuum subsystem 46 to create negative pressure within drum 44 interior; energize drum drive motor 70 to start the drum rotating at the low loading speed.

After the drum rotates approximately 280°, as indicated by the output of the optical encoder 116, the optical encoder 116 supplies a signal to the system control electronics 74. A signal is then again supplied from the control electronics 74 to the electromagnetic brake 118 to stop the drum 44 at this position so as to cut the storage medium. The system control electronics 74 then supplies a signal to the cutter module 84 to engage the cutter solenoid, which comprises a linear solenoid actuated clamp which firmly holds the storage medium to be cut and a rotary solenoid which rotates the shear blade to cut the storage medium. In addition to the signal sent to the electromagnetic brake 118 in order to stop the rotation of record drum 44, a signal is sent to the record drum clutch 120 and the loading capstan clutch coupling 122 to deenergize these couplings. After the storage medium has been cut so as to provide the predetermined quantity of storage medium for recording, equiva-lent to the amount of storage medium contained on a 280° portion of the circumference of the outer surface of the drum 44, control signals are again transmitted to the drum motor 70 which causes the drum 44 to resume its rotation until the hold-down clamp 90 again reaches its top-vertical position; that is after an additional 80° of rotation assuming the drum was stopped after 280° of rotation. During this interval the ironing roller 88 has smoothed or ironed the trailing edge of the cut storage medium onto the record drum 44 outer surface. At this point, that is when the hold-down clamp 90 has reached the top-vertical position as indicated by the once per revolution pulse supplied from the optical encoder 116 to the system control electronics 74, a control pulse is supplied from the system control electronics 74 to the ironing roller 88 control mechanism which raises the ironing roller 88 to the stowed position. At this point the loading sequence has been completed and the record function may be initiated, assuming all other initial conditions are met.

At the conclusion of the loading sequence, a signal is sent to the system control electonics 74 which enables the record logic and generates a control pulse to drive motor 70 to accelerate the drum 44 up to the record speed dictated by the selected mode recorder operation. The record/processor system 20 at this time is in the record stand-by mode in which all subsystems are ready for the record function. Recording on the record drum 44 is performed by the generation of a raster scan resulting in a systematic scan of the laser beam 36 which is focused through the lens 100 to a spot on the storage medium plane, the laser beam being modulated in intensity as a function of the transmitted video signal over the entire image format. As was previously mentioned, the rectilinear raster is generated through the coordinated rotation of the record drum 44 and the incremental indexing of the lens carriage assembly 42. During recording, the record drum 44 supports the storage medium within the focal plane of the objective lens 100 associated with the laser optical processing system, the record drum 44 rotating at the precise velocity required to maintain position lock with the horizontal sync signal of the incoming video signal.

The sequence of functions controlled by the record logic portion of the system control eectronics 74 is as follows: generate command signal to drum motor 70 to cause the motor 70 to accelerate the drum 44 to the selected record speed; generate command signal to the lens carriage drive 62 to cause the lens carriage 42 to step in response to the vertical sync signal of the incoming video signal; end the recording by either an external command signal received from an operator control switch or a signal received from the carriage limit switch (not shown) associated with the lens carriage 42 which indicates the end point of translation for the lens carriage 42; and the supply of a control signal to the lens carriage drive 62 to reset the lens carriage 42 to its start position at the end of the recording sequence. The lens carriage step function is controlled by the once per revolution output of the optical encoder 116 which is in phase lock sync with the incoming video signal sync portion and is controlled by the servo feedback loop and timing system 66–68 associated with drum 44. It should be noted, that when a particular mode of operation is selected, the logic, that is the motor-potentiometer combination associated with the variable aperture mask 156 associated with the lens carriage 42, is adjusted to the appropriate spot size and aspect ratio for the incoming video information.

The recording mode can preferably be ended at any time at the discretion of the operator or it may run the full frame at which time it will end automatically due to the generation of a signal from the lens carriage 44 limit switch to the system control electronics 74. There are, however, several functions which preferably must be satisfied before the processing sequence is enabled by the processing logic portion of the system control electronics 74. These functions are the generation of an end of record command either from the carriage limit switch or via the operator and an external control switch (not shown); to decelleration of the record drum 44 so as to cause rotation at a low speed; the receipt of a process command such as generated by the closure of a switch (not shown) by the operator; and the receipt of a pulse signal indicating that the processor 52 is at the required processing temperature, this signal being received from the conventional temperature sensor network 76 which regulates the internal processing temperature of the processor 52. When these signals have been received, the processing logic portion of the system control electronics 74 is enabled. This causes the generation of a control pulse to the record drum drive motor 70 to position the record drum 44 to the clamp 90 top-vertical position; a pulse is then generated to the clamp motor (not shown) to cause the clamp 90 to open, the clamp being designed preferably to physically pry the leading edge of the storage medium away from the circuit drum 44 outer surface as the clamp 90 opens; and a control signal is generated to the peel-off knife assembly 92 to cause the insertion of the mechanical fingers associated therewith for guiding the storage medium off the drum 44 towards the processor 52 input. The exposed storage medium containing the latent image thereon is then directed between rollers 204 and 216 of the conveyor system 94 associated with thermal processor 52. The exposed storage medium is then fed between the upper and lower belts 200 and 202, respectively, of the conveyor system 94 which convey this exposed storage medium towards the processing chamber 96 of the thermal processor 52. As the storage medium is conveyed towards the processing chamber 96, the belts 200 and 202 are caused to separate before entry of the exposed storage medium into the processing chamber by means of rollers 212 and 224, the exposed storage medium remaining on the lower belt 202. At this point, guide 248 is positioned so as to prevent curl-up of the edges of the exposed storage medium. The exposed storage medium is then conveyed into the processing chamber 96 by means of lower belt 202 which is driven at a rate sufficient to permit sufficient exposure time for the latent image at the predetermined processing temperature which is maintained by thermal conduction in the interior of the processing chamber 96, so as to permit the development of the latent image into an actual displayable image. The lower belt 202 thereafter conveys the developed latent image into cooling chamber 98 wherein the actual displayable image is permitted to cool for a relatively short predetermined time interval. It should be noted that when the initial conditions requisite to the initiation of the processing sequence are met, a control signal is supplied by the processing logic to the associated motor drives 240 of the positively driven rollers 216 and 214 of conveyor system 94 to initiate movement of the conveyor system 94. As shown in FIG. 3, the endless belts in the conveyor system follow the paths indicated by the arrows in FIG. 3. Preferably, in the cooling chamber 98 air is forced on to the developed emulsion in order to promote hardening thereof. The operation of the laser recorder in generating the raster scan through the laser optical system has not been discussed in greater detail than above, as the use of an intensity modulated laser to generate a recording spot is primarily conventional.

As was previously mentioned, if desired, a conventional thermal platen processor may be utilized in place of the processor 52 illustrated in FIG. 3, in which instance the exposed storage medium is fed to the platen processor and heat is applied via the platen to the storage medium in conventional fashion to expose the latent image and produce an actual displayable image therefrom.

By utilizing the present invention, information, such as video information, can be received and transformed into density variations on a storage medium so as to produce a latent image thereon, and thermally processed so as to produce an actual displayable image almost immediately after the recording of the latent image, such operation being performed automatically in sequential fashion.

It is to be understood that the above described embodiments of the invention are merely illustrative of the principles thereof and that numerous modifications and embodiments of the invention may be derived within the spirit and scope thereof.

What is claimed is:

1. An apparatus for recording a data input on, and thermally processing, a thermally processable storage medium comprising rotatable drum means, having an outer surface; means for loading a predetermined quantity of said storage medium about a portion of the outer surface of said drum means;

means mounted in cooperative relation with said drum means for generating a raster scan on said loaded storage medium in accordance with said data input to expose said loaded storage medium and produce a thermally processable latent image thereon corresponding to said data input;

means for thermally processing said exposed storage medium; and means including synchronizing means for unloading said exposed storage medium from said drum surface after said exposure and transferring said exposed medium to said thermal processor means for developing said latent image;

said thermal processing means including a processing chamber containing air, said chamber having a pair of spaced apart heating means for heating the air within the chamber for uniformly providing heat within the chamber through thermal convection through the heated air; conveyor means, including a low mass supporting means for said transferred exposed storage medium, said low mass supporting means being substantially uniformly spaced between said heating means pair and having a low thermal conductivity whereby said low mass supporting means does not act as a heat sink during said thermal processing, said unloading means transferring said exposed storage medium to said low mass means, and means for driving said low mass means at a predetermined processing rate in at least one direction for conveying said exposed storage medium through said processing chamber for a predetermined time interval to enable said thermal convection within the chamber to develop said latent image into said actual displayable image, said conveyor means comprising a pair of low mass endless belts of low thermal conductivity, said pair comprising an upper belt and a lower belt, said lower belt being said supporting means, said exposed storage medium being conveyed to said processing chamber from said recording drum between said upper and lower belts and being substantially held in place therebetween, and means for separating said upper and lower belts prior to entry of said exposed storage medium into said chamber for thermal processing of said exposed storage medium latent image, said exposed storage medium being conveyed through said processing chamber solely on said lower belt low mass support-ing means during thermal processing of said latent image into said actual displayable image, said latent image being present solely on the side of the exposed storage medium not in contact with the lower belt, whereby said latent image is completely processed to form an actual displayable image corresponding to said data input at the output of said apparatus.

2. An apparatus in accordance with claim 1 wherein said raster scan generation means includes a light source means capable of receiving said data input and being modulated in response thereto to generate at least a portion of said raster scan.

3. An apparatus in accordance with claim 2 wherein said light source is a source of coherent light.

4. An apparatus in accordance with claim 3 wherein said coherent light source is a laser.

5. An apparatus in accordance with claim 4 wherein said laser source means includes means for modulating the intensity of said laser source output in response to said data input.

6. An apparatus in accordance with claim 2 wherein said raster scan comprises at least one scan line, said apparatus further includes means for rotatably driving said drum means about an axis of rotation in a predetermined direction at at least a predetermined recording rate, and said raster scan generation means includes a lens carriage means mounted in cooperative relation with said light source for focusing said modulated light source on at least a first spot on said loaded storage medium, said drum drive means being operable in synchronism with said lens carriage means to provide at least said one raster scan line in said predetermined direction of drum rotation.

7. An apparatus in accordance with claim 6 wherein said raster scan comprises a plurality of scan lines, and said raster scan generation means further includes means for translating said lens carriage means substantially normal to said predetermined direction of drum rotation along an axis substantially parallel to said axis of rotation in accordance with said data input for focusing said modulated light source at a different spot on another scan line translated substantially normal to said first spot scan line so as to provide said plurality of scan lines.

8. An apparatus in accordance with claim 7 wherein said translating means includes means for incrementally translating said lens carriage means in said substantially normal direction along said substantially parallel axis so as to incrementally translate said focusing spot between at least two scan lines in said plurality whereby said raster scan is incrementally advanced.

9. An apparatus in accordance with claim 8 wherein said light source is a laser means.

10. An apparatus in accordance with claim 9 wherein said laser source means includes means for modulating the intensity of said laser source output in response to said data input.

11. An apparatus in accordance with claim 8 wherein said lens carriage incremental translation means comprises a rotatable lead screw means, said lens carriage means being mounted in cooperative relation with said lead screw means for translation along said substantially parallel axis in conjunction with rotation of said lead screw means, and stepping drive means for rotatably driving said lead screw in accordance with said data input for incrementally translating said lens carriage means whereby said raster scan is incrementally advanced.

12. An apparatus in accordance with claim 11 wherein said stepping drive means comprises a stepping motor means having at least one predetermined stepping increment, and said lead screw means has a predetermined pitch, a basic scan pitch and stepping time being determined by said lead screw pitch and said stepping increment.

13. An apparatus in accordance with claim 1 wherein said drum means includes vacuum means for maintaining said load predetermined quantity of storage medium substantially in contact with said drum surface portion while said raster scan is generated.

14. An apparatus in accordance with claim 1 wherein said loading means comprises means for storing a quantity of unexposed storage medium greater than said predetermined quantity,capstan means for driving said unexposed storage medium from said storage means and cutter means for cutting said predetermined quantity from said greater quantity; said drum means includes clamp means for clamping the leading edge of said unexposed storage medium during loading, said unexposed storage medium being threaded from said storage means through said capstan means through said cutter means to said clamp means during loading, and means for rotatably driving said drum to load said predetermined quantity of said storage medium about said drum surface portion; and said loading means further comprises means for cooperatively controlling said capstan means, said film cutter means, said clamp means and said drum drive means for cutting said predetermined quantity of storage medium from said greater quantity when said predetermined quantity is loaded about said drum surface portion.

15. An apparatus in accordance with claim 1 wherein said storage medium is a dry silver medium.

16. An apparatus in accordance with claim 1 wherein said thermal processor further includes a cooling chamber, and means for driving said storage medium containing said developed latent image into said cooling chamber for cooling said developed storage medium to promote hardening thereof.

17. An apparatus in accordance with claim 1 wherein said conveyor means includes means for positively driving said upper belt substantially in synchronism with said lower belt, said upper and lower belts each being separately positively driven.

18. An apparatus in accordance with claim 1 wherein said conveyor means further includes means for maintaining said belts in tension for enabling said exposed storage medium to be substantially held in place therebetween due to the relative tensions of the belts.

19. An apparatus in accordance with claim 1 wherein said processing chamber heating means includes a pair of spaced apart radiant heating sources and a heat diffusion means in cooperative association therewith for providing said thermal convection.

20. An apparatus in accordance with claim 1 wherein said processing chamber includes a platen for flattening said low mass supporting means during the passage thereof through the processing chamber, said low mass supporting means being between said exposed storage medium and said platen.

21. An apparatus for thermally processing an exposed thermally processable storage medium having a latent image recorded thereon comprising a processing chamber containing air, said chamber having a pair of spaced apart heating means for heating the air within the chamber for uniformly providing heat within the chamber through thermal convection through the heated air; and conveyor means including a low mass supporting means for supporting said exposed storage medium on one side thereof, said low mass supporting means having a low thermal conductivity whereby said low mass supporting means does not act as a heat sink during said thermal processing and being substantially uniformly spaced between said heating means air so as to be subjected to heat from opposite sides thereof, and means for driving said low mass means at a predetermined processing rate in at least one direction for conveying said exposed storage medium through said processing chamber for a predetermined time interval to enable said thermal convection within said chamber to develop said latent image into an acutal displayable image; said conveyor means comprising a pair of low mass endless belts of low thermal conductivity, said pair comprising an upper belt and a lower belt, said lower belt being said supporting means said exposed storage medium being conveyed to said processing chamber between said upper and lower belts and being substantially held in place therebetween, and means for separating said upper and lower belts prior to entry of said exposed storage medium into said chamber for thermal processing of said exposed storage medium latent image, said exposed storage medium being conveyed through said processing chamber solely on said lower belt low mass supporting means during thermal processing of said latent image into said actual displayable image, said latent image being present solely on the side of the exposed storage medium not in contact with the lower belt.

22. An apparatus in accordance with claim 21 wherein said conveyor means includes means for positively driving said upper belt substantially in synchronism with said lower belt, said upper and lower belt each being separately positively driven.

23. An apparatus in accordance with claim 21 wherein said conveyor means further includes means for maintaining said belts in tension for enabling said unexposed storage medium to be substantially held in place therebetween due to the relative tensions of the belts.

24. An apparatus in accordance with claim 31 wherein said processing chamber heating means includes a pair of sapced apart radiant heating sources and a heat diffusion means in cooperative associated therewith for providing said thermal convection.

25. An apparatus in accordance with claim 21 wherein said processing chamber includes a platen for flattening said low mass supporting means during the passage thereof through the processing chamber, said low mass supporting means being between said exposed storage medium and said platen.

* * * * *